Patented June 29, 1948

2,444,347

UNITED STATES PATENT OFFICE 2,444,347

METHOD OF TREATING GLASS WOOL AND PRODUCT RESULTING THEREFROM

Herbert H. Greger, Washington, D. C., and Raymond F. Remler, Lakewood, Ohio; said Remler assignor, by mesne assignments, to The Briggs Filtration Company, Bethesda, Md., a corporation of Maryland No Drawing. Application June 2, 1944, Serial No. 538,534

15 Claims. (Cl. 117—126)

This invention relates in general to bonded and coated glass wool and more particularly has reference to such compositions of matter in which the binder and/or the bonding agent in the coating composition is basically an aluminum or an equivalent phosphate.

Glass wool consists of a mass of drawn or spun fibers of glass. The fibers may vary in diameter and composition depending upon the use to which they are to be put. The more resistant glass compositions are required for glass wool application, due to the exposure of the high ratio of fiber surface to volume.

Glass compositions are in general acted upon by alkalies and especially when the glass is in the form of fine fibers, such as is the case of glass wool, it is particularly affected and disintegrated by the action of alkaline substances.

Glass wool is suitable for many uses and in a number of instances it is formed into bats or bodies of various forms.

Glass compositions in general are acted upon by alkalies and for this reason no success has been had with the use of an alkaline compound such as water glass (sodium silicate) as an agglutinant or binder.

At present, glass wool is bound together in various forms by synthetic organic resins. Although these compounds are commercially feasible, they have the unfortunate property of charring with the evolution of obnoxious odors when raised to decomposition temperatures, and at the same time they lose their bonding properties.

Due to the low alkali content of glass wool and its high susceptibility to attack by alkaline substances, inorganic binders of an alkaline nature, such as sodium silicate, cannot be used as an agglutinate or coating for the glass wool.

We have found that colloidal aluminum phosphate being acid in properties, and an excellent bonding agent, can be used per se or preferably in combinations with other materials as an agglutinant for, or binder for, coatings on glass wool.

An object of this invention is to provide an inorganic agglutinate and/or coating for glass wool or glass fibers.

Another object of this invention is to provide a composition of matter comprising glass wool in the form of bodies of predetermined shape agglutinated and/or coated with a substance having an aluminum phosphate base to maintain such shape.

A further object of this invention is to provide a composition of matter comprising glass wool or glass fibers agglutinated and/or coated with a colloidal solution of aluminum phosphate.

Still another object of this invention is to provide methods for applying colloidal aluminum phosphate base agglutinates or coatings to glass fibers.

Aluminum phosphates in the colloidal form possess highly desirable bonding properties. These phosphates are of acid nature and therefore can be used in association with glass wool and glass fibers without any appreciable reaction taking place between the same and the glass. For certain applications the colloidal aluminum phosphate alone may be used. In other applications it has been found desirable to incorporate some additional materials with the colloidal aluminum phosphate. Depending upon the particular application the additional material will vary from a minor proportion to a major proportion of the mixture.

The additive materials can be inorganic or organic. In the case of coatings where the additive materials are used as a large percentage of the whole, they are mostly or entirely inorganic and therefore are not inflammable. When the aluminum phosphate is used as an agglutinant, a small percentage of an organic plasticizer or oil may be used with the binder. This small percentage of organic material is readily flameproofed by the phosphate, and being present in such small quantities does not affect the binding properties of the composition.

The additive materials may be listed as follows:

1. *Fillers.*—Silica or silicious materials as diatomaceous earths, fire clay or other types of grog, ganister and other neutral or acid refractory material.

2. *Reacting Material.*—Talc, vermiculite, asbestos, clays, bauxite, aluminum oxide and other oxides of amphoteric metals.

3. *Plasticizers.*—Glycerine, mineral oil, glucose.

4. *Wetting Agents.*—(operable in acid solutions). Sodium naphthalene sulfonate, di-hexyl ester of sodium sulfo-succinic acid, alkyl naphthalene sulfonic acid, sulfated lauryl alcohol, sodium salt of higher secondary alkyl sulfate.

These additive materials can be used in different amounts and combinations, as by varying the quantities of these substances in mixtures the rigidity, hygroscopicity, alkalinity, solubility and spread of the coating or bonding agglutinants can be changed to conform with the physical or chemical requirements under which the final product is to be used.

The fillers and reacting materials may be varied to such an extent that it is difficult to give any critical ranges. The plasticizer may be used up to about 50% of the aluminum phosphate. A small quantity of wetting agent, usually ⅛ to ¼ of one percent of the aluminum phosphate solution, may be used but can be widely varied.

This invention besides applying the colloidal aluminum phosphate as an agglutinant for the loose wool and as a coating of varying thickness to wool products and shapes, contemplates other uses of aluminum phosphate per se and in combinations with additive substances as a binder for denser forms and as a binder in a dry form in the production of a dry airsetting insulating plastic.

*Example of coatings*

| Material | Parts by Weight |
| --- | --- |
| Inert filler—100 mesh | 600 |
| Reactive Material—100 mesh | 100 |
| Plastic Clay (Ball) | 300 |
| Colloidal Aluminum Phosphate | ¹ 100 |
| Water | 600 |

¹ Dry basis.

To the above may be added to suit conditions, a small amount of wetting agent ¼ to ½ parts by weight, or inorganic or acid stable organic colors to give the necessary color or tint. The aluminum phosphate employed in this example is preferably selected from those ranging from the mono-aluminum phosphate to the sesqui-aluminum phosphate. When aluminum phosphates having a higher aluminum content are used it will probably be necessary to add a small quantity of a substance containing the $SO_4$, Cl or $NO_3$ ion.

*Example of binder for loose wool*

| Material | Parts by Weight |
| --- | --- |
| Colloidal Aluminum Phosphate | ¹ 10 |
| Plasticizer as glucose | 3 |
| Water | 87 |

¹ Dry basis.

To the above may be added, to suit conditions, a small amount of wetting agent or sulfurated oil. With this binder may also be applied a small amount of mineral oil to reduce brashness and dusting. For this example the aluminum phosphate used ranged between the mono- and that having an $Al_2O_3$ to $P_2O_5$ ratio of 1¼:3. By adding up to 10% (dry basis) of a substance containing the $SO_4$, Cl or $NO_3$ ion, the aluminum phosphate range may be extended up to that having an $Al_2O_3$ to $P_2O_5$ ratio of 1⅝:3.

*Example of binder for insulation plastic or denser forms*

| Material | Parts by Weight |
| --- | --- |
| Plastic Clay (Ball) | 300 |
| Reactive Material | 200 |
| Colloidal Aluminum Phosphate | ¹ 150 |
| Wetting Agent | 0.25 to 0.5 |

¹ Soluble powder.

To the foregoing is added glass wool to give the desired density, and water to give the required workability for application. In this example, the aluminum phosphate employed had an $Al_2O_3$ to $P_2O_5$ ratio ranging from 1⅜:3 to 1⅝:3. Of course, the aluminum phosphate employed may range from the mono-aluminum phosphate to the di-aluminum phosphate.

Aluminum phosphates vary in composition depending upon the ratio of the aluminum to the phosphate ion. For purposes of the present invention, the composition of the aluminum phosphate may vary from the mono-aluminum phosphate $Al(H_2PO_4)_3$ to the di-aluminum phosphate $Al_2(HPO_4)_3$. Some of the aluminum phosphate compositions between the mono- and the di-, such as the sesqui-aluminum phosphate and others, have been found to be very effective. The higher the aluminum to phosphate ion ratio, the more easy is the hydrolysis of the aluminum phosphate. To insure the maintenance of a colloidal solution even with compounds of high aluminum content the present invention provided for the addition substances containing the $SO_4$, Cl, or $NO_3$ ions. These may be added as salts of aluminum, iron, lime, zinc or magnesium. These compounds may be added in the ratio of 10% on the dry basis. Organic acids, such as oxalic and lactic, may be used for this purpose in similar quantities.

Aluminum phosphate binders suitable for use in the present invention may be made in accordance with the disclosures in the Greger Patent No. 2,405,884.

Application of the binders to the glass wool or fibers may be effected in various manners. As indicated in the example of a plastic insulating material the binder may be admixed with the glass fibers. In other instances, the binder used as an agglutinant or a coating may be sprayed or brush applied to the glass wool bodies. Alternatively, the glass wool bodies may be dipped in the binder composition. After application of the binder to the glass fiber or wool bodies (pressing if desired and) drying is effected.

Binders in dry form may be admixed or dusted on the glass fiber or wool bodies either before or after application of moisture to the bodies, or without any moisture.

Application of heat and pressure may be employed after the binder has been applied to the glass fibers or wool to effect molding of the same to various shapes.

From the foregoing, it will be appreciated that the present invention provides a very effective agglutinant and coating for bodies or masses of glass fibers or glass wool.

When used as an agglutinant, many advantages are obtained which are not possible with the presently used synthetic resins. As a coating on the molded articles, the binder removes or reduces brashness of the bodies due to the projecting sharp ends of the glass fibers.

We claim:

1. A composition of matter comprising glass wool fibers bonded together with an aluminum phosphate binder.

2. A composition of matter comprising glass wool fibers arranged to form a body of predetermined form and an aluminum phosphate binder joining together adjacent fibers to maintain the form of said body.

3. A composition of matter comprising a mass of glass wool fibers coated and agglutinated with a colloidal solution of aluminum phosphate.

4. A composition of matter comprising a mass of glass wool fibers coated with an aluminum phosphate base binder.

5. A composition comprising a loose mass of glass fibers coated and agglutinated with an aluminum phosphate base binder.

6. A composition comprising a compacted mass of glass fibers coated and agglutinated with an aluminum phosphate base binder.

7. A plastic insulating composition comprising a mixture of ball clay, a filler, colloidal aluminum phosphate, and glass wool.

8. A plastic insulating composition comprising a mixture of ball clay, a filler, colloidal aluminum phosphate, glass wool, a wetting agent, and water.

9. A method of producing form retaining bodies of glass wool comprising applying a binder of aluminum phosphate base thereto, and drying the binder.

10. A method of producing form retaining bodies of glass wool comprising spraying a binder of aluminum phosphate base thereon, and drying the binder.

11. A method of producing form retaining bodies of glass wool comprising applying a binder of aluminum phosphate base thereto, compressing the so treated glass wool to desired form, and drying the binder while so compressed.

12. A method of producing form retaining bodies of glass wool comprising applying a binder of aluminum phosphate base thereto, drying the binder, and applying an aluminum phosphate base coating to the thus formed body.

13. A method of producing form retaining bodies of glass wool comprising applying a binder of aluminum phosphate base thereto, compressing the so treated glass wool to desired form, drying the binder while so compressed, and applying an aluminum phosphate base coating to the thus formed body.

14. A composition of matter comprising a mass of glass fibers bonded together with a binder comprising colloidal aluminum phosphate, a mineral oil and water.

15. A composition of matter comprising a mass of glass fibers bonded together with a binder comprising colloidal aluminum phosphate, plastic clay, a wetting agent and water.

HERBERT H. GREGER.
RAYMOND F. REMLER.

REFERENCES CITED

The following references are of record in the file of this patent:

UNITED STATES PATENTS

| Number | Name | Date |
|---|---|---|
| 692,197 | Gehre | Jan. 28, 1902 |
| 1,507,379 | Hoskins | Sept. 2, 1924 |
| 2,218,058 | Stalhane | Oct. 15, 1940 |
| 2,237,745 | Musgrave | Apr. 8, 1941 |

FOREIGN PATENTS

| Number | Country | Date |
|---|---|---|
| 449,751 | Great Britain | 1936 |